Figures 1, 2:
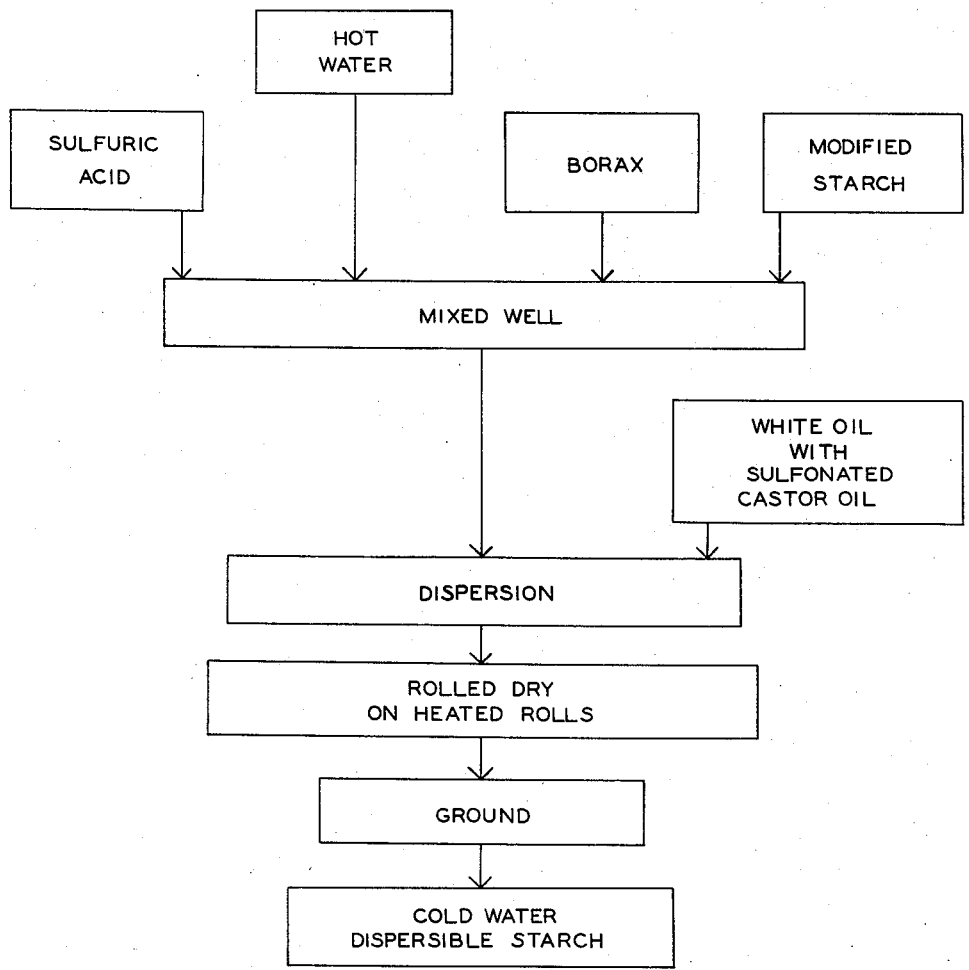

Dec. 23, 1958      J. W. TODD      2,865,775

COLD WATER DISPERSIBLE STARCH AND PROCESS OF PREPARING IT

Filed Sept. 18, 1957

AMOUNT OF ADDITIVES
EXPRESSED
IN PERCENTAGES OF STARCH
BY WEIGHT
BORAX _____ 30 - 40 %
SULFURIC ACID _____ 4 - 7 %
WHITE OIL _____ 1 - 2 %

INVENTOR.
JAMES W. TODD

BY
Jerome R. Cox
ATTORNEY

2,865,775

COLD WATER DISPERSIBLE STARCH AND PROCESS OF PREPARING IT

James William Todd, Columbus, Ohio, assignor to National Industrial Products Company, Columbus, Ohio, a corporation of Ohio Application September 18, 1957, Serial No. 684,703

6 Claims. (Cl. 106—213)

The inventions disclosed in this application relate to products derived from starchy polysaccharides which can be dispersed in cold water at ordinary temperatures and pressures and to processes for the preparation of such products. The inventions relate more particularly to the preparation of pregelatinized starches, or cold water soluble laundry starches and to processes or methods of producing them. Such starch products are to be marketed in the dry state, but are to be capable of being dispersed in cold water to form colloidal dispersions at ordinary temperatures without cooking or heating. It is well known that in order to disperse ordinary native starchy polysaccharides in water to obtain colloidal, clear or translucent dispersions it is necessary to heat or cook the starch suspensions until gelatinization occurs. If this heating or cooking is done by the user, it entails the expenditure of time and effort on the part of such user and adds to the consumer's cost in obtaining a starch in dispersed form.

In order to prepare starches which disperse or swell readily in cold water, it has been proposed to apply an ungelatinized starch, mixed with water to revolving hot rolls on which the starch is gelatinized and dried in the form of a thin film which is subsequently flaked off and ground to the desired degree of fineness.

It has also been proposed to premoisten a normally air dried starch, a relatively small quantity of borax being added to increase the water absorption capacity and the added water being preferably about 15% to 60% based on the weight of the starch, and then screen this premoistened starch to break up any lumps and render it to a fluffy condition, after which it is proposed to subject the fluffy starch to the direct action of steam which gelatinizes the starch and gives a resultant crumbly gelatinous mass. After steaming, the gelatinous starch is dried somewhat, then is passed through a suitable mill, heated in a current of warm air and simultaneously ground and dried. In this proposal, it was found desirable in order to produce a suitable product to add, in addition to the borax, a water-absorptive filler such as clay. This addition of clay was proposed because the borax tended to produce a gummy mixture when the starch was steamed.

Various other methods have been employed in the past in efforts to obtain satisfactory cold water dispersible and cold water soluble starch products. One method involves passing moist starch filter cake between heated rolls and grinding the dried gelatinized product to a powder. Another process involves an enzyme treatment by which the starch is hydrolyzed to a low viscosity level which treatment is followed by completely gelatinizing and drying the converted starch on heated rolls.

Another process proposes the oxidation of the starch with an oxidizing agent followed by gelatinization and dehydration of the gelatinized paste. In all of these prior art processes whether by heating, ezyme treatment, or by acid treatment or by oxidation, a gelatinized or hydrolyzed and gelatinized product is obtained. All of these processes are comparatively costly and involve complications in carrying them out. All of the products of these various processes are not of equal desirable characteristics in that they do not all have rapid dispersibility, high solubility, good solution in cold water, equal stiffener value in sizing, uniformity in the size coating, nor the provision of a smooth flexible finish after ironing.

In application Serial No. 516,564, filed June 20, 1955, now Patent No. 2,819,980, McCombs and Hyldon disclosed a process utilizing native starch in which they mixed borax with the native starch and thereafter adjusted the pH of the mixture to a pH in the range of 3.5 to 6.5 by the addition of an acid, and then rolled the dispersion dry and sifted. It was proposed in such prior application of McCombs and Hyldon Serial No. 516,564 to mix native starch in water with a relatively small proportion of borax (not more than 15%) and then to adjust the pH of the mixture to approximately 4.0, and thereafter roll dry.

It has also been proposed to prepare adhesives (as distinguished from laundry starches) from starch conversion syrups by dehydrating a starch conversion syrup to isolate the solid materials thereof and then heating the isolated solids under conditions conducive to polymerization in the presence of an acidic material which functions as a catalyst, such acidic material being preferably a weak non-volatile acid such as, for example, boric acid. It has also been proposed to prepare a starch composition for the laundrying of articles by mixing with the starch a highly divided pigment and an electrolyte compound such as borax or other alkali metal borate.

However, in all of the prior art it has never heretofore been proposed so far as I am aware, to mix an acid-modified starch with a relatively high proportion of borax and thus form an eminently satisfactory cold water dispersible and cold water soluble starch.

I have found that if I mix borax with acid-modified thin boiling starches (as distinguished from native starches) in proportions appreciably above those used by McCombs and Hyldon, and much, much greater than the catalytic and electrolytic proportions proposed in the manufacture of the adhesives and pigment containing compositions referred to above, I can obtain an eminently satisfactory cold water soluble starch.

One of the objects of my invention therefore is the provision of a new dry starch product, which is rapidly dispersible and highly soluble in cold water (i. e. has a higher rate of solution in cold water), is especially adapted for use as laundry starch, exhibits acceptable stiffening value and has uniformity in size coating, freedom from water spotting on fabrics when the latter is sized, dried and sprinkled with water, and has the ability to create a smooth flexible finish when a fabric sized therewith is ironed.

A further object of the invention is the provision of a process for the production of such a starch product which is economical in use and simple in operation.

Further objects and features of the invention will be apparent from the subjoined specification and claims when considered in connection with the accompanying drawings.

In the drawings:

Fig. 1 is a flow sheet illustrating a process of producing my new composition of matter; and Fig. 2 is a chart showing the relative proportions of additives used to the starch used.

As indicated in Figure 1 in the embodiment illustrated, I add sulfuric acid, borax, and modified starch (i. e. thin boiling starch) to hot water while continuously stirring. After well mixed, I add a mixture of white oil (white mineral oil or liquid paraffin) and a small proportion of sulfonated castor oil. This forms a dispersion of the solid materials in water and this dispersion is then rolled dry on heated rolls.

In a typical factory mix of materials, I have used the constituents in about the following proportions by weight:

| | Lbs. |
|---|---|
| Water | 1000 |
| Starch | 500 |
| Borax | 170 |
| $H_2SO_4$ | 30 |
| White oil [1] | 6.7 |
| Total | 1706.7 |

[1] The white oil has about 1% of sulfonated castor oil mixed with it.

The amount of water may vary over wide ranges. I often use water in about double the amount of starch by weight. I prefer to use thin boiling (converted or modified) starches. The viscosity of starches is sometimes indicated directly by a Scott viscosity reading and is sometimes indicated by a fluidity rating based on a fluidity of 100 for water. I find that a more accurate indication is based on the following method. I add a quantity of the starch to be tested to a gallon of water so as to bring the Scott viscosity of the mixture to 45 Scott. The weight of the starch necessary to achieve this result is the weight-viscosity rating of the starch. Based on this method, untreated wheat starch has a weight-viscosity of 7 oz. (meaning that 7 oz. of untreated wheat starch mixed in a gallon of water creates a mixture having a Scott viscosity of 45). In this rating 5–7 oz. starches (i. e. those requiring 5–7 oz. of starch to a gallon of water to make a 45 Scott viscosity mixture) are designated thick boiling starches, and 8–50 oz. starches (i. e. those requiring 8–50 oz. of starch to a gallon of water to make a 45 Scott viscosity mixture) are designated thin boiling starches. Based on this method I prefer to use starches having weight-viscosities of from 18 oz. to 40 oz. In factory runs, I have used a thin boiling wheat starch having a weight-viscosity of 18 oz. mixed with an equal quantity by weight of a thin boiling corn starch having a weight-viscosity of 40 oz. I prefer blends of about 50% wheat and about 50% corn starch in order to produce stability in the final product. However, either a thin boiling wheat starch alone, or a thin boiling corn starch alone as well as other intermediate blends of thin boiling wheat starch and thin boiling corn starch are satisfactory. Even mixtures of thick boiling starch with thin boiling starches can be used but the product is inferior.

The borax should be more than 30% of the starch but I prefer that less than 40% of the starch weight be used. A fair average is 34%.

The amount of sulfuric acid obviously depends on its strength. In a factory mix where a 78% sulfuric acid is used, from 5 to 7% of acid based on the weight of the starch may be used. However, I prefer that the pH of the dried material be about 8.3. A laboratory grade of sulfuric acid is obviously stronger and from 4 to 6% sulfuric acid is sufficient.

I prefer that the final dried product should have a pH between about 8.0 and 8.5. The amount of borax used as recommended above is sufficient to neutralize the sulfuric acid and make the final product slightly alkaline as desired.

I prefer to add a minor percentage of white oil to improve ironing and other qualities. I prefer that an amount of white oil (white mineral oil or liquid paraffin) equal to about 1 to 2% of the starch by weight. However, no white oil or from 0–4% may be added if desired. If white oil is added, I prefer to mix with it, prior to adding it, a small quantity of sulfonated castor oil. The amount of sulfonated castor oil should be approximately 1% of the amount of the white oil by weight. That is before adding the white oil I stir in .01 lb. sulfonated castor oil per lb. of white oil. The sulfonated castor oil acts as a dispersing agent for the white oil.

After introducing the solid ingredients into the water, they are well mixed as for example by stirring for from 3–15 hours. The mixture is then rolled dry on heated metal rolls. Thereafter, the dried product is ground to a powder.

Following are examples showing experiments leading to the method and product of my inventions and examples of the practice of my inventions.

*Example I*

To 6 liters of hot water at 120° F., I added 605 g. borax and stirred for a half hour. I then added 88 g. concentrated laboratory (99.5% strength) sulfuric acid continuing the stirring. I then added 2 lbs. (908 g.) of a thin boiling, 95 fluidity, corn starch (40 oz. weight-viscosity on the scale discussed above) mixed with 2 lbs. (908 grams) of a thin boiling 95 fluidity acid converted wheat starch (40 oz. weight-viscosity on the scale discussed above). This gave a mixture having a compensated Baumé rating of 16.9° (temperature compensated from 16.2°). The mixture was stirred. After stirring 3 hours, the mixture had a pH of 7.8. The mixture was rolled dry on heated drying rolls at a temperature of approximately 340° F. The dried product was ground in a large laboratory micro pulverizer without a screen. Tests were made comparing the product with a well known commercial cold water dispersible laundry starch. All tests showed my product to be fully dispersible and equal or better in mixing quality. The color appeared to be superior. On ironing no highlights were noted. The pH of the dried ground product was 8.2. A sample of the dried product was reground through a .020" screen. The reground product mixed with water better and without any lumps.

*Example II*

To 4 liters of hot water at 120° F., I added 567 g. borax and stirred for a half hour. I then added 82 g. concentrated laboratory (99.5% strength) sulfuric acid continuing the stirring. I then added 3.69 lbs. of a thick boiling 10 fluidity (6 oz. weight-viscosity on the scale discussed above) blend of 50% wheat starch and corn starch which is designated by me as #1055 blend. After stirring for about 3 hours the mixture had a Baumé of 19.6° and a pH of 7.8. The mixture was rolled dry on heated drying rolls at a temperature of approximately 340° F. The dried product was ground in a large laboratory micro pulverizer without a screen. Tests were made comparing the product with cold water dispersible laundry starch of Example I. All tests showed this product to be poor in dispersibility and in mixing quality. When allowed to stand it settled out quite rapidly. In starching tests, this product caused high lights on the cloth. It was not satisfactory.

*Example III*

To 4 liters of hot water at 110° F., I added 600 g. borax and stirred for a half hour. I then added 89 g. concentrated laboratory (99.5% strength) sulfuric acid continuing the stirring for another half hour. I then added 2 lbs (908 g.) of a thin boiling, 95 fluidity, corn starch (40 oz. weight-viscosity on the scale discussed above) mixed with 2 lbs. (908 grams) of a thick boiling 10 fluidity wheat starch (7 oz. weight-viscosity on the scale discussed above). This gave a mixture having a compensated Baumé rating of 21.0. I added 500 mls. water and obtained a Baumé rating of 20.0. I continued stirring for a total of 4½ hours. After stirring, the mixture had a pH of 7.6. The mixture was rolled dry on heated drying rolls at a temperature of approximately 340° F. The dried product was ground in a large laboratory micro pulverizer without a screen. The pH of the dried ground product was 8.4. In mixing tests, the dispersed starch settled out more than the starch of Example I but much less than the starch of Example II. On using for starching cloth samples and ironing some highlights were discovered but not as many as in the case of Example II. The starching qualities of this product was fair.

*Example IV*

To 4.5 liters of hot water at 110° F., I added 89 g. concentrated laboratory (99.5% strength) sulfuric acid. I added 616 grams of borax stirring well. I then added 2 lbs. (908 g.) of a thin boiling, 95 fluidity, corn starch (40 oz. weight-viscosity on the scale discussed above) mixed with 2 lbs. (908 grams) of a thin boiling 87 fluidity acid converted wheat starch (18 oz. weight-viscosity on the scale discussed above). I stirred one hour, allowed to stand overnight and restirred. I then added 24 grams of white oil and ¼ gram sulfonated castor oil which was first mixed with the white oil. The mixture was stirred. After stirring, the mixture had a pH of 7.8 and a Baumé of 20°. The mixture was rolled dry on heated drying rolls at a temperature of approximately 340° F. The dried product was ground in a large laboratory micro pulverizer without a screen. The mixing quality of the product was found to be very favorable and the product dispersed readily. The product had very good ironing quality with no sticking.

*Example V*

To 750 gallons of hot water (120° F.) I added 8″ of a hot thin boiling (87 fluidity—weight-viscosity rating of 18 oz.) acid converted wheat starch slurry containing 2500 lbs. of starch (dry weight), 1700 lbs. of borax; and 292 lbs. of commercial (59° Baumé—78%) sulfuric acid. After stirring 2 hours I added 100 lbs. more of borax and then added 2500 lbs. of corn starch (a thin boiling corn starch—95 fluidity—weight-viscosity 40 oz. in a dry state). I mixed the dispersion thoroughly by stirring overnight. The 8″ of wheat starch slurry represented about 700 gallons having about 2500 lbs. of dry wheat starch. I then added 200 lbs. more of borax and 67 lbs. of white petroleum oil to which 0.67 lb. of sulfonated castor oil had been added. The pH of the mixture was 7.4. I then dried the dispersion on heated rolls and ground the size of a .020 screen.

The mixing quality of the ground dried product was very favorable and the product was readily dispersible in water to form a clear dispersion. The ironing quality was very good with no sticking. The product had superior stiffness and body.

*Example VI*

To 1500 gallons of hot water (120° F.) I added 16″ of a thin boiling (87 fluidity—weight-viscosity rating of 18 oz.) acid converted wheat starch slurry; 5000 lbs. of a thin boiling (95 fluidity—weight-viscosity rating of 40 oz.) corn starch in a dry state; 3400 lbs. of borax; 584 lbs. of commercial (59° Baumé—78%) sulfuric acid; and 134 lbs. of white petroleum oil with 1.5 lbs. of sulfonated castor oil mixed in. I mixed the dispersion thoroughly by stirring overnight. The 16″ of wheat starch slurry represented about 1400 gallons having about 5000 lbs. of dry wheat starch. The pH of the mixture was 7.3–7.4. I then dried the dispersion on heated rolls and ground the size of a .020 screen. Four samples of the dried powder had moisture contents of 7.3%, 7.2%, 5.4% and 4.6% respectively and pH ratings of 8.2, 8.3, 8.3 and 8.2 respectively.

The mixing quality of the ground dried product was very favorable and the product was readily dispersible in water to form a clear dispersion. The ironing quality was good with no sticking.

*Example VII*

To 990 gallons (11 inches) of hot water (120° F.) I added 16″ of a thin boiling (87 fluidity—weight-viscosity rating of 18 oz. 20.7° Bé.) acid converted wheat starch slurry; 5000 lbs. of a thin boiling (95 fluidity—weight-viscosity rating of 40 oz.) corn starch in a dry state; 3400 lbs. of borax; 584 lbs. of commercial (59° Baumé—78%) sulfuric acid; and 134 lbs. of white petroleum oil with 1.5 lbs. of sulfonated castor oil mixed in. I mixed the dispersion thoroughly by stirring overnight. The 16″ of wheat starch slurry represented about 1400 gallons having 5082 lbs. of dry materials. The wheat starch slurry was made by mixing 16,659 lbs. of native wheat starch with 4801 gal. of water, 480 lbs. of sulfuric acid and 400 lbs. of soda ash. The theoretical solids in the total mix had a dry weight in lbs. of approximately:

| | |
|---|---:|
| Wheat starch | 4,917.29 |
| Foxhead starch | 4,400.00 |
| Borax | 2,597.60 |
| Sulfuric acid | 455.52 |
| White oil | 134.00 |
| Sodium sulfate | 155.88 |
| Total | 12,660.29 |

It consisted of 35 inches (3150 gallons at 25.7° Bé.) and composed of about 4.67 lbs. of dry solids to a gallon. The pH of the mixture was 7.4. I then dried the dispersion on heated rolls and ground the size of a .020 screen. Three samples of the dried powder had moisture contents of 6.0%, 5.5% and 7.2% respectively and pH ratings of 8.3, 8.2 and 8.3 respectively.

The mixing quality of the ground dried product was very favorable and the product was readily dispersible in water to form a clear dispersion. The ironing quality was good with no sticking.

*Example VIII*

To 11 inches of water (90 gallons) (120° F.) I added 16″ (4955 lbs.) of a thin boiling (87 fluidity—weight-viscosity rating of 20.5 Bé.) acid converted wheat starch slurry; 5000 lbs. of a thin boiling (95 fluidity—weight viscosity rating of 40 oz.) corn starch in a dry state; 3400 lbs. of borax; 584 lbs. of commercial (59° Baumé, 78%) sulfuric acid; and 134 lbs. of white petroleum oil with 1.5 lbs. of sulfonated castor oil mixed in. I mixed the dispersion thoroughly by stirring overnight. I then dried most of the dispersion on heated rolls and ground the size of a .020 screen.

The mixing quality of the ground dried product was very favorable and the product was readily dispersible in water to form a clear dispersion. The ironing quality was good with no sticking.

*Example IX*

I took a small portion of the dispersion from that produced in Example VIII and heated it with steam. Then I sprayed the heated dispersion through a spray dryer to dry and ground to the size of a .020 screen.

The mixing quality of the spray dried product of this example was likewise very favorable and the product was also readily dispersible in water to form a clear dispersion. The ironing quality was good with no sticking.

The dispersion may also be dried in various other ways.

It is to be understood that the above described embodiments of my invention are for the purpose of illustration only and various changes may be made therein without departing from the spirit and scope of my invention.

I claim:

1. A cold water dispersible starch comprising the product of mixing starch of which at least 50% is thin boiling, borax in a quantity approximating 34% by weight of the starch on a dry basis and sulfuric acid in a quantity approximating 6% of the weight of the starch on a dry basis.

2. The composition of matter of claim 1 with which there is incorporated a minor proportion of a mixture of white petroleum oil and sulfonated castor oil.

3. The composition of matter of claim 2 with which there is incorporated a minor proportion of a mixture of white petroleum oil and sulfonate castor oil, said mixture of white petroleum oil and sulfonated castor oil being incorporated in a quantity approximating 1% of the weight of the starch on a dry basis.

4. A cold water dispersible starch comprising the product of mixing starch of which at least 50% is a thin boiling starch, borax in a quantity of from 30% to 40% of the starch by weight on a dry basis, and sulfuric acid in a quantity of from 4% to 7% of the starch by weight on a dry basis.

5. A cold water dispersible starch comprising the product of mixing starch of which at least 50% is a thin boiling starch, borax in a quantity of from 30% to 40% of the starch by weight on a dry basis, sulfuric acid in a quantity of from 4% to 7% of the starch on a dry basis, and white petroleum oil in an amount approximating 1% of the starch by weight on a dry basis.

6. A process of preparing a cold water dispersible starch which comprises mixing in hot water, thin boiling starch, borax, and sulfuric acid in which the borax is from 30% to 40% of the starch by weight and the sulfuric acid is from 4% to 7% of the starch by weight; drying by heat; and grinding.

References Cited in the file of this patent

UNITED STATES PATENTS

| | | |
|---|---|---|
| 337,490 | Gray | Mar. 9, 1886 |
| 579,827 | Higgins | Mar. 30, 1897 |
| 675,822 | Duryea | June 4, 1901 |
| 2,142,801 | Power | Jan. 3, 1939 |
| 2,424,050 | Pecker | July 18, 1947 |

FOREIGN PATENTS

| | | |
|---|---|---|
| 11,598 | Great Britain | 1888 |
| 10,216 | Great Britain | 1906 |

UNITED STATES PATENT OFFICE
CERTIFICATE OF CORRECTION

December 23, 1958

Patent No. 2,865,775

James William Todd

It is hereby certified that error appears in the printed specification of the above numbered patent requiring correction and that the said Letters Patent should read as corrected below.

Column 4, line 39, for "tirred" read -- stirred --; column 6, line 37, for "(90 gallons)" read -- (990 gallons) --; column 7, line 6, for "sulfonate" read -- sulfonated --.

Signed and sealed this 9th day of June 1959.

(SEAL)
Attest:

KARL H. AXLINE
Attesting Officer

ROBERT C. WATSON
Commissioner of Patents